June 13, 1961 H. PAPST 2,988,377
COMBINED AIR AND RUBBER SPRING SUSPENSION
FOR VEHICLES AND SEATS
Filed May 18, 1959 2 Sheets-Sheet 2

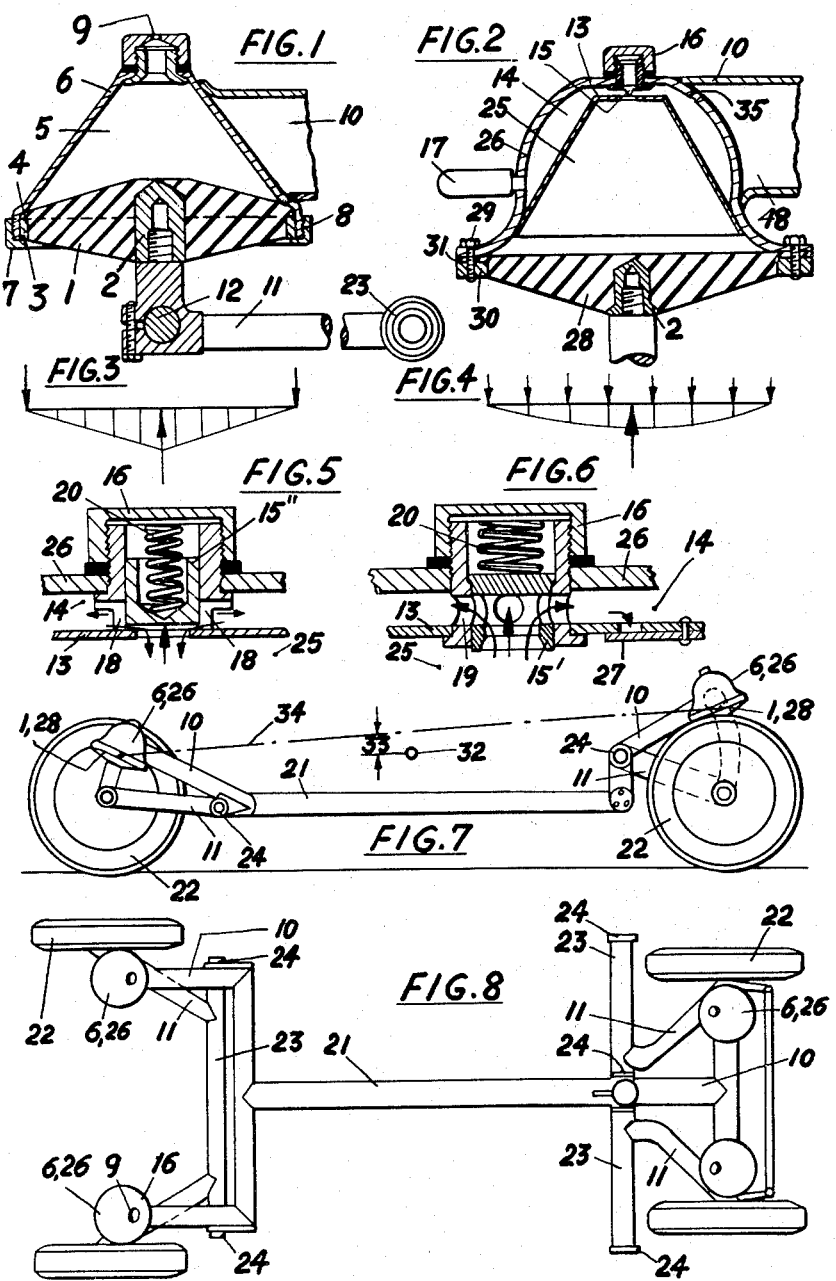

INVENTOR
Hermann Papst
BY
Lowry & Rinehart
ATTYS

United States Patent Office 2,988,377
Patented June 13, 1961

2,988,377
COMBINED AIR AND RUBBER SPRING SUSPENSION FOR VEHICLES AND SEATS
Hermann Papst, 1 Karl Maierstrasse, St. Georgen, Schwarzwald, Germany
Filed May 18, 1959, Ser. No. 814,097
12 Claims. (Cl. 280—124)

This invention relates to a combined air and rubber spring suspension for vehicles and seats.

Known vehicle suspensions which make use of rubber as resilient material are simple and silent, but their damping effect or spring action is inadequate.

Rubber is known to retain its elastic properties under normal elongational loads without residual permanent deformation. However, when subjected to higher loads which the provision of an effective damping action requires, rubber tends quickly to suffer from fatigue and its life is curtailed because the ageing process is accelerated by the internal deformational work.

A known type of combined air and rubber suspension consists in that a pot secured to the road wheel axle or the chassis of a vehicle contains a flexible rubber disc which is thrust into the pot by a ram. In the course of this action the rubber disc which of itself has no positive guiding effect is forced away from a cover plate containing a guiding bush, and this motion therefore draws air and dust into the pot by the resultant suction effect. Squeals and rapid wear are the natural result.

Other known air suspensions comprise bellows-shaped rubber members, either in the form of folding, annular, or roller-type bellows. Such membranes or bellows devices rely exclusively upon the damping effect of the air. Damping is often not satisfactory because the air space above the membranes is much too large. If the air pressure system fails, the mobility of a vehicle is largely impaired.

Consequently, fully satisfactory effects have not in the past been achieved in air suspensions comprising rubber elements.

It is, therefore, an object of the present invention to overcome the above-mentioned disadvantages and to provide a combined air and rubber spring suspension for vehicles and seats in which the rubber elements are not overloaded and the elastic membrane is relieved as far as circumstances permit.

Another object of the invention is to provide a longer stroke for taking up the thrust.

Still another object of the invention is to improve the safety of travel by providing a reliable guiding action that does not depend upon the damping or pressure medium and is also maintained if the compressed air system fails and full load deflections ensue.

Yet another object of the invention is to improve the life of the rubber-air suspension elements.

The invention provides a combined air and rubber spring suspension for vehicles and seats, which comprises a rubber disc spring of substantially double-cone shape, capable of supporting the total stationary load substantially by itself; a substantially cone-shaped hollow cup member closed by the rubber disc spring in a pressure-tight manner, said rubber disc spring, when fully deflected, being thrust into the interior of said hollow cup member in such a manner as to displace nearly the entire volume of a pressure medium contained in the interior of the hollow cup member into supplementary pressure chambers or to the outside through known throttle valves.

The damping or pressure medium contained inside the cup member, either air or some other gas, or a liquid, will then have the effect of restoring the disc spring into its unstressed state, so that under normal load the disc spring will not be under elongational stress.

Under normal impact loads, such as may be expected when travelling on ordinary roads, the deformational work will not involve subjecting the disc spring to stresses likely to damage the same.

The total available deflection of the disc spring is very considerable since the cooperation of the pressure medium roughly reduces the stress on the disc spring by an amount represented by the stationary load.

On especially rough roads, when subjected to exceptionally hard shocks, the disc spring can be deflected until it substantially fills the interior of the cup member, expelling the pressure medium therefrom through the throttle valves. The disc spring will then resume its normal position, but its return will be damped.

The reduction in the otherwise usual elongation of the material of the rubber disc spring thus achieved is a substantial advantage because the life of the disc spring will be greatly prolonged.

The proposed arrangement prevents the disc spring from showing signs of premature aging. Furthermore, it prevents penetration of dust and consequent bruising which is likely to impair satisfactory working of an air and rubber spring suspension.

It is further proposed to provide communication between the hollow interior of the cup member and of damping, equalizing or storage containers in which a gas pressure is maintained at a level which will restore the substantially double-cone shaped rubber disc spring approximately into its normal position and hence into a substantially unstressed state when the load transmitted from the wheels is again normal.

In the combination proposed by the invention it is essential that the rubber disc spring should be sufficiently thick to carry the vehicle in the event of collapse of the pressure of the medium due to a fault in the pressurized system. Moreover, the dimensional design of the disc spring should reliably ensure lateral stability. The rubber disc spring forms a pressure-tight seal on the substantially cone-shaped hollow cup member, full deflection of the disc causing the latter to be thrust into the cup member in such a manner that the pressure medium is displaced from the hollow interior into supplementary pressure chambers or to the outside through throttling cross sections in a manner which as such is already known to the art.

The proposed suspension has the advantage of great simplicity and safety compared with known annular or roller type bellows air suspensions in which the rubber member is elongationally stiffened by the provision of a fabric base to ensure that the air will perform the spring work instead of the rubber.

The interior of the cup member above the rubber disc spring communicates with supplementary pressure chambers through throttling cross sections or valves. Consequently, in such a form of construction the shock loads will be largely absorbed by the enclosed medium which will also support the stationary load if its pressure is suitably high. As such, the known type of rubber disc spring which works without the assistance of air is light and inexpensive. However, in the arrangement according to the application the rubber is not required to provide the necessary damping. The elastic material which in fact supports the stationary load is the pressure medium which is not subject to fatigue. The proposed combined air and rubber spring suspension is therefore durable, simple, and capable of being produced at moderate cost whilst having comparatively little oscillating inertial mass.

By providing intercommunication between the several pressurized cup members or supplementary pressure chambers above the rubber spring discs the development of lateral and longitudinal oscillations in motor vehicles is largely suppressed. Moreover, by providing supplementary pressure chambers of relatively large capacity a soft and well damped suspension can be achieved. The supplementary pressure chambers can be provided without additional cost by using the cavities in a chassis of tubular construction.

A soft suspension necessitates locating the rubber spring discs at the level of the center of gravity of the vehicle or in the planes which contain the partial centers of gravity over the axles. Location of the rubber spring discs above the centers of gravity is an advantage because this will cause an inward cant when the vehicle turns corners. The rubber spring discs may be specially adapted to existing front and rear axle wheel loads to permit the same air pressures to be used in all tires. The chassis of tubular construction may be used both as an air reservoir and as an intercommunicating connection to provide high damping by causing rapid rises in pressure.

The air pressure on the rubber spring discs may in order of magnitude be equal to the tire pressure of the vehicle. However, air above the disc springs may be replaced by a liquid to render the degree of damping independent of the compression of the air above the disc springs. Generally speaking, it will be sufficient if a pressurized gas is displaced from the hollow cup member when the disc spring is fully deflected.

Several preferred embodiments of the invention are shown by way of example in the accompanying drawings, in which:

FIG. 1 is a vertical section through a rubber disc spring and a cone-shaped hollow cup member mounted on said spring and serving as a pressure chamber for a damping or pressure medium which is subjected to increasing pressure as the disc spring is deflected;

FIG. 2 is a view similar to FIG. 1 but showing the cup member provided with a supplementary pressure chamber;

FIGS. 3 and 4 are diagrams illustrating the load distribution on a rubber disc spring with and without a compensating air cushion;

FIGS. 5 and 6 are enlarged fragmentary vertical sections through automatic throttle valves which are functionally dependent upon the impact velocity of the shock load;

FIG. 7 is a side elevational view of a motor vehicle chassis with rubber disc spring suspensions;

FIG. 8 is a top plane view thereof, and

Figure 9:
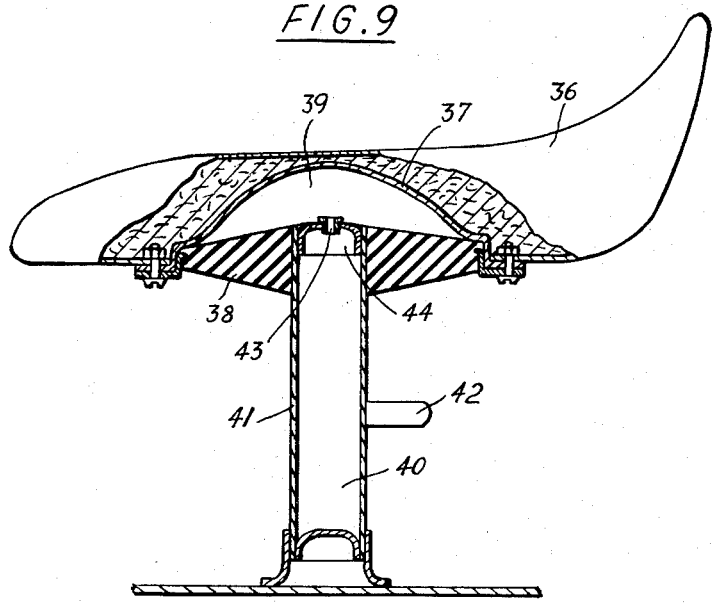
FIG. 9 is an elevational view, partly in vertical section, of a rubber disc spring suspension incorporated in a vehicle seat.

A rubber disc spring 1 of substantially double-cone shape is bonded firmly by vulcanization in gas-tight manner to an inner core portion 2 and a peripheral ring 3. A projecting rubber edge 4 on the rubber disc spring 1 and a flanged ring 7 with a thread 8 form a gas-tight joint for containing a damping or pressure medium inside a cone-shaped hollow cup member 6. This medium may be air or some other gas, or a liquid. The tapering interior 5 of the cup member 6 is substantially filled by the deflected rubber disc spring 1 when the latter sustains a maximum shock load. Whenever the rubber disc spring 1 is subjected to impact deflection, the pressure medium contained in the tapering interior 5 of the cup member can escape through a throttling opening 9. By the provision of self-acting valve means the throttling opening 9 may throttle either when the pressure medium is expelled or admitted. The cup member 6 is affixed to an arm 10 of the chassis, or the like, whereas the core portion 2 is connected with an axle 12 additionally guided by a swing lever 11.

In FIG. 2 a cup member 13 with an interior 25 is surrounded by a supplementary pressure chamber 14, formed by a casing 26, in such manner that the interior 25 and the chamber 14 above a rubber disc spring 28 can be filled with air and possibly partly with an auxiliary liquid at any desired pressure. Heavy shocks automatically more widely open a valve 15. Removal of a screw cap 16 which constitutes a pressure-tight seal gives access to the valve 15. A valve 17 permits the chamber 14, the interior 25 and a chamber 48 to be pressurized, the latter via a communicating opening 35, in the same way as a pneumatic tire. The rubber disc spring 28 is vulcanized to a flanged ring 30 and its rubber edge 31 is secured by several screws 29 to casing 26 so as to form a gas-tight seal.

A rubber disc spring of about 170 mm. diameter designed to take up the wheel load of a normal saloon car is arranged to transmit the full stationary load to the enclosed medium when the pressure is equal to that used in a normal pneumatic tire. When the rubber disc spring is deflected the pressure of the enclosed medium will rise, the increase being greater in the case of an abrupt shock than in the case of a slow one, depending upon the throttling effect. Even distribution of the countervailing load due to the resistance of the enclosed pressure medium is taken into consideration in the design of the profile of the rubber disc spring 1 in FIG. 1 or 28 in FIG. 2. The load distribution in the case of a freely suspended rubber disc spring 1 is illustrated in FIG. 3. The manner in which the loads acting on the spring 28 are balanced is shown in FIG. 4.

In FIG. 5 a valve 15″ is embodied in a piston valve with throttling ports 18 which are more widely opened towards a spring 20 when the load increments are rapid. In FIG. 6 throttling cross sections 19 are reduced when the pressure in the interior 25 rises abruptly, due to a piston valve 15¹ transmitting greater thrust to the spring 20. Shock absorbing effects adapted to the nature of the vehicle and to the manner in which the vehicle is driven can thus be achieved. A return flow flap valve 27 allows the wheels of the car to regain contact with the ground more quickly.

The employment of a rubber disc spring 1 or 28 in the chassis of a motor vehicle is illustrated in FIGS. 7 and 8. The cone-shaped cup member 6 or the casing 26 are shown mounted on arms 10 of a chassis 21 preferably at an appropriate height for the center of gravity 32 to be located, if possible, at a distance 33 below the plane 34 which connects the centers of the rubber disc springs 1 and 28. The spring suspension may then be arranged to be very soft without causing the vehicle body to tilt undesirably when the vehicle turns corners. Road wheels 22 are mounted at the end of levers 11 which may be connected in pairs by a central member 23. The central member 23 is mounted in conventional manner in the vehicle chassis 21 in swing bearings 24. The swing levers 11 are arranged on at least one side of the axle at an angle to permit the steered wheels to be deflected to full lock in front or rear wheel steering vehicles.

The supplementary chamber 14 may be formed by the tubular chassis members 10, 21 or 11, 21 respectively which provide a comparatively large air space for compressed air without additional cost. The tubular chassis 21 will then provide a kind of force-coupling through the enclosed air between the four wheels. This coupling can be restricted to the left or right hand side or to the front or rear axle wheels by the provision of parting walls in the channels formed by the tubular chassis. The provision of a comparatively large capacity air space inside the chassis 21 makes for an extremely soft suspension, undesirable secondary effects being suppressed by the damping and the slope of the spring curves of the rubber disc springs.

In FIG. 9 a hollow member 37 is directly incorporated in a vehicle seat 36, an arrangement which, in addition to providing excellent springing by a rubber disc spring 38 and the occluded air, also ensures a reliable translatory guiding effect. At the same time the seat 36 can be laterally deflected within the required range in every direction, as the rubber disc springs 38 can yield to tilt.

If desired cavities 39 and 40 are pumped up through valve 42, whereas a throttling opening 43 in core 44 of the disc spring communicates with tubular support 41 which forms a compressed air reservoir. Oscillations of the seat engendered by shocks when the vehicle travels will therefore be quickly damped. The pressure reservoir 41 may alternatively form part of the vehicle frame or vehicle chassis. The described arrangement constitutes an excellent seat for motor vehicles, office chairs, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A combined pneumatic and rubber spring suspension subject to a normal load and capable of momentarily sustaining an increased load, said suspension comprising a substantially cone-shaped hollow cup member having an opening, and a rubber disc spring closing said opening and pressure sealing the same, said rubber disc spring being rigidly secured to said cup member and being of a heavy construction capable of self-sustaining the normal load, said rubber disc spring having a thickened central portion and a load applying member secured to said central portion to deflect said rubber disc spring into said cup member with said rubber disc spring more closely approaching the wall of said cup member as said rubber disc spring is deflected into said cup member and said rubber disc spring displacing substantially the entire volume of said cup member in the fully displaced position of said rubber disc spring, at least one supplementary compensating chamber communicating with the chamber defined by said cup member and said rubber spring disc through a variable throttle opening, said hollow cup member and said supplementary compensating chamber being subjected to a fluid under pressure with the force exerted by said pressure on said rubber disc spring being substantially equal to the normal load, whereby said rubber disc spring when subjected to the normal load assumes an unstressed position.

2. The structure of claim 1; said compensating chamber communicating with the interior of said hollow cup member comprising a hollow frame member of a vehicle chassis.

3. A combined pneumatic and rubber spring suspension as claimed in claim 1, wherein said variable throttle opening includes a valve subject to the flow of fluid and having a variable orifice.

4. A combined pneumatic and rubber spring suspension as claimed in claim 1, wherein said variable throttle opening includes variable orifices controlled by a spring loaded piston with said variable orifice connecting the interior of said cup member with the interior of said supplemental chamber.

5. The structure of claim 4; said piston progressively opening said orifice upon increases of pressures in said hollow cup member.

6. The structure of claim 4; said piston progressively closing said orifice upon pressure increases in said hollow cup member.

7. The structure of claim 4; including check valve means interposed between said compensating chamber and the interior of said hollow cup member and permitting one-way flow of fluid pressure from the compensating chamber into the hollow cup member upon the reduction of loading on said rubber disc spring.

8. A combined pneumatic and rubber spring suspension as claimed in claim 1, wherein said load applying member is hollow and defines said supplementary chamber.

9. A vehicle chassis comprising a plurality of vertically oscillatably support arms mounted on the chassis and terminating above the center of gravity of said chassis, and combined pneumatic and elastic suspension means connected to the terminal ends of said support arms, said suspension means each comprising a hollow inverted member secured to the chassis, an elastic diaphragm sealingly secured to the lower end of said hollow member and fixed to the terminal end of one of said support arms, said elastic diaphragm being sufficiently strong to maintain the chassis stable during static loading thereon.

10. The combination of claim 9; means for pressurizing the interior of said hollow member to place a residual compensating load on said diaphragms.

11. The structure of claim 10; said chassis including hollow frame portions communicating with the interior of said hollow member and forming compensating chambers therefor.

12. The structure of claim 11; and throttling valve means interposed between said hollow members and compensating chambers and subject to pressure changes in said hollow members.

References Cited in the file of this patent

UNITED STATES PATENTS

| 2,363,308 | Focht | Nov. 21, 1944 |
| 2,735,670 | Schultze | Feb. 21, 1956 |
| 2,858,127 | Moulton | Oct. 28, 1958 |
| 2,901,241 | Lautzenhiser et al. | Aug. 25, 1959 |

FOREIGN PATENTS

| 698,953 | Great Britain | Oct. 28, 1953 |
| 183,609 | Austria | Oct. 25, 1955 |